United States Patent [19]
Murray

[11] Patent Number: 5,278,480
[45] Date of Patent: Jan. 11, 1994

[54] DOOR OPENER CONTROL WITH ADAPTIVE LIMITS AND METHOD THEREFOR

[75] Inventor: James S. Murray, South Lyon, Mich.

[73] Assignee: Stanley Home Automation, Novi, Mich.

[21] Appl. No.: 966,365

[22] Filed: Oct. 26, 1992

[51] Int. Cl.$^5$ .............................................. G05B 11/14
[52] U.S. Cl. .................................... 318/626; 318/590; 318/266; 318/286; 318/561
[58] Field of Search ............... 318/264, 265, 266, 268, 318/286, 466, 467, 468, 561, 567, 566, 590, 591, 626

[56] References Cited

U.S. PATENT DOCUMENTS

| | | | |
|---|---|---|---|
| 4,234,833 | 11/1980 | Barrett | 318/282 |
| 4,259,625 | 3/1981 | Hatakeyama et al. | 318/283 X |
| 4,563,625 | 1/1986 | Kornbrekke et al. | 318/603 |
| 4,638,433 | 1/1987 | Schindler | 364/400 |
| 4,713,591 | 12/1987 | McCloskey | 318/257 |
| 4,736,144 | 5/1988 | Chun-Pu | 318/467 |
| 4,980,618 | 12/1990 | Milnes et al. | 318/265 |
| 4,988,992 | 1/1991 | Heitschel et al. | 340/825.69 |
| 5,069,000 | 12/1991 | Zuckerman | 49/28 |

*Primary Examiner*—Bentsu Ro
*Attorney, Agent, or Firm*—Krass & Young

[57] ABSTRACT

A garage door operator has a microcomputer based control which is programmed to measure door position from full open position by counting motor revolutions and to determine motor speed and deceleration for each revolution. The program learns the open and closed position limits as well as force sensitivity limits for up and down operation with minimal user input. During normal door operation the closed limit and the sensitivity limits are adaptively adjusted to accommodate changes in conditions. The lowest up and down motor speeds in each operation are stored for comparison with motor speeds in the next like operation for obstruction detection. Motor deceleration is also monitored for obstruction detection. For a more sensitive obstruction detection during closing, the motor speed is mapped for each revolution for the last several inches of closing. The map is stored after each successful closing operation and the corresponding speeds in the next closing are compared point-by point with the mapped speeds to detect slow down due to touching an obstruction.

22 Claims, 5 Drawing Sheets

DOOR OPENER CONTROL WITH ADAPTIVE LIMITS AND METHOD THEREFOR

FIELD OF THE INVENTION

This invention relates to garage door openers and the method of operation of such door openers.

BACKGROUND OF THE INVENTION

It is known to provide garage door openers or operators with upper and lower position limits, and with sensitivity or torque limits. Generally manual adjustment or selection is provided to allow the user or the installer of the door operator to set position limits which coincide with the fully open and fully closed positions of the door, and to set sensitivity limits which permit sufficient torque to move the door throughout its complete range in both opening and closing direction, but not enough torque to damage the door. A given model of operator may be intended for use on light doors, which might be damaged by too much torque, as well as heavy doors. It is important to match the operator to the door by the sensitivity setting to achieve proper operation and no damage due to the door.

The sensitivity setting and the position limits are also used in obstruction detection for stopping the door to prevent damage to the obstruction. By using the maximum sensitivity which is consistent with proper door operation the damage to an obstruction can be minimized. It is a requirement that an obstruction detection feature be utilized during door movement except in the last inch prior to the closed position. Thus the closed position limit is useful in identifying the door position above which obstruction detection is armed.

It is also known, as disclosed in U.S. Pat. No. 4,638,433 to Schindler, to use a microprocessor control for a garage door operator and to use that control to establish limits by a learning method. That is, by manipulating switch inputs to the controller, the installer or user can place the control in a program mode and run through a door operation procedure which causes the controller to determine the position limits and up and down force limits. The position limits are constant values throughout operation of the opener. If any changes of position limits are required, they are accomplished by repeating the program or learn mode. The force limits have an offset in addition to the learned force which is large enough to accommodate changes in force due to temperature or other variations. Each of the up and down force limits is a single value which is applied over the travel range of the door, irrespective of local force requirement at particular door positions.

The practice of setting force limits with offsets large enough to anticipate changing conditions results in low sensitivity to the detection of obstructions. It is preferred that such an offset be small to attain high sensitivity. Thus another method of accommodating changes in door opening and closing force is desired. The effective floor position may change as a result of heaving due to frost or by a build-up of ice on the floor, for example. It is thus desirable to automatically change the closed limit position to reflect the actual end of door travel, and to accomplish such a change in limit without manually entering the program mode.

It is also desirable to provide a high sensitivity range at the lower portion of door closing travel. This lower range of travel is the most likely place to encounter obstructions, especially small children and toys, and a higher sensitivity in that region will minimize the risk of harmful impact.

SUMMARY OF THE INVENTION

It is therefore an object of the invention to set or reset sensitivity limits in accordance with the forces operating on the door not only in conjunction with a learn mode but throughout the operating mode as well, thereby maintaining a current basis for the sensitivity limits and permitting small offsets which are indicative of excess force caused by an obstruction.

It is also an object of the invention to increase the sensitivity to an obstruction during the final several inches of door closing.

Another object of the invention is to set or reset the down position limit in accordance with the detected position of the floor, not only in learn mode but throughout the operating mode as well.

The garage door operator has a motor for driving the door in each direction and sensors which detect motor rotation. The number of rotations is counted to measure the distance travelled using the fully open position as the zero position. The motor speed and deceleration are determined from the time elapsed per revolution and its variance from the preceding revolution. Door opening or closing loads cause the motor speed to drop below a nominal no-load value and the lowest speeds reached during successful opening and closing, respectively, minus an offset are used as the sensitivity limit settings. Any motor speed lower than the respective sensitivity limit is presumed to be caused by an obstruction. When such a speed is reached during a closing movement, the door is stopped and then opened. If the limit speed is reached during an opening movement, the door is merely stopped.

The operator circuit is based on a microcomputer which is programmed to function in a learn mode for initial setting of the limits, and in an operate mode for controlling the door to operate in accordance with the limits an to update the limits each time the door successfully completes its travel. Initial motor speed settings for different sensitivity levels are stored in the microcomputer. The operator has separate manually actuated up and down learn switches or push buttons.

To initiate the up learn mode, beginning with the door closed, the up learn button is pushed, causing the door to travel in the opening direction. Preferably, the controller is set to raise the door 2 inches each time the button is momentarily depressed and 12 inches if the button is held down, unless the door load causes premature stoppage. The most sensitive stored motor speed setting s selected first. If the motor speed drops below the setting due to the door load, the door will stop. The push button must be pressed again, causing the next lower sensitivity to be selected automatically and the door opening is attempted again. This process is repeated until the door reaches its fully open position which is identified by the release of the up learn button. The motor speed setting which allowed successful complete opening of the door is stored as the initial sensitivity limit for door opening. The fully open position of the door is designated as the "zero" or reference position of the door from which the door closing distance is measured. This method of learning an approximately correct sensitivity requires no user selection of sensitivity and it prevents damage to a door which might occur if the initial motor speed setting were too low, permitting too great a force to be applied to the door. The sensitivity for the closing direction is learned in the same way and for the same reason.

To initiate the down learn mode the down learn mode button is pushed, causing the door to travel in the closing direction. A single button actuation will cause complete door closing if not interrupted by low motor speed caused by door load. It is preferred to place a 1 inch block on the floor under the door to stop the door at an obstruction level above which the controller is sensitive to any obstruction which causes the motor speed or deceleration to pass a limit. When the limit is exceeded, the door stops and then reverses direction if it is above the 1 inch obstruction level; the door merely stops if it s beyond the obstruction level. As in the case of the up learn mode, the most sensitive of several stored motor speed settings is selected. If the setting does not permit the door to close to the block position, progressively less sensitive settings are chosen and the button pushed again until the door successfully closes. The last chosen setting is stored as the initial sensitivity limit for door closing.

When the door closes against the 1 inch block (verified by observation of the user) the drop in motor speed below the sensitivity limit or deceleration greater than a preset value signals that the 1 inch limit is reached. That limit is recorded by the controller and 1 inch is added to that value to establish the initial door closed position limit.

In the operate mode, the fully open or reference position of the door remains at the position determined during the up learn mode; the closed position limit and the sensitivity limits are updated for each respective normal door operation. This updating accommodates gradual changes in conditions. Thus if shifts in floor position occur or stiffness in movement occurs due to temperature change, for example, the limits automatically adjust. Then the limits can be maintained very close to actual operating conditions and the offset for obstruction detection is very small. In the case of updating the sensitivity limits, the motor speed is monitored during opening and closing and the lowest motor speed encountered during a successful opening or closing is used, with an offset, to determine a new sensitivity limit for that travel direction, and the new limit replaces the previous one. For updating the closed position, the stopping position is measured for each closing operation, and if the position is an inch or more from the current limit, the position limit is adjusted by a small increment in a direction to reduce the under-travel or over-travel to yield a new closed position limit. The new limit may not, however, be more than two inches from the initial closed position limit determined during the learn mode. The obstruction level is defined as one inch above the current closed position limit and accordingly it is automatically adjusted. Thus the limits adapt to the prevailing conditions affecting the door operation.

To make the door operator more responsive to an obstruction during its lower range in closing direction than is possible by the single value closing sensitivity limit, the motor speed is mapped at each motor revolution during each closing over the final several inches of travel, say, from 12 inches above the closed position limit to the obstruction reference, and the mapped values are stored in the controller. Then during the next closing operation each newly measured motor speed is compared to the stored speed at the corresponding door position. If the motor speed is below the stored value by a predetermined offset, an obstruction is detected and the door will be caused to stop and then reopen. Whenever the door closes without detection of an obstruction, the most recent set of mapped speeds is substituted for the previous one.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description covers the inventive aspects of the subject garage door operator and method of operation. Certain features often included in such door openers such as light controls, a vacation switch, an obstruction detector such as a light beam, and others are not described herein since they form no part of the invention, although it is expected that some or all of such functions would be included as normal adjuncts to the operator.

Figure 1:
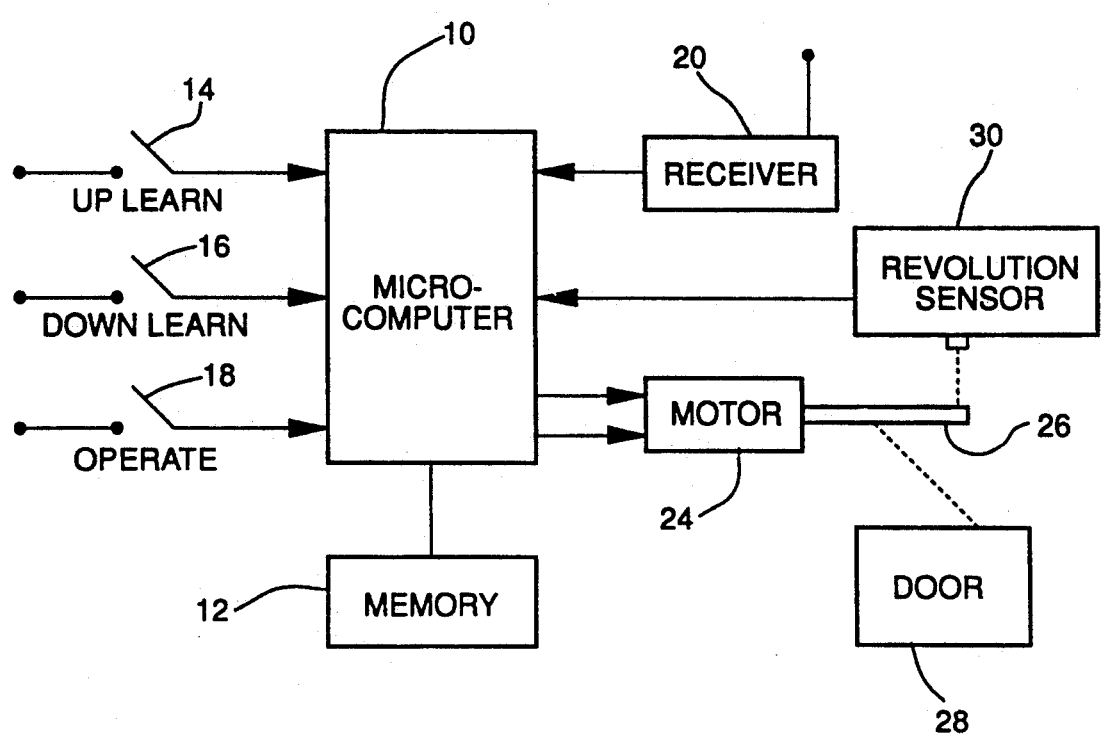
FIG. 1 is a block diagram of the control circuit for carrying out the invention.

As shown in FIG. 1, the controller for the door operator is based on a microcomputer 10 having a nonvolatile memory 12 for storing operating programs and door settings. Switch inputs to the microcomputer 10 are an UP LEARN button 14, a DOWN LEARN button 16, and an OPERATE button 18. A radio receiver 20 provides another operate input in response to a remote radio transmitter, not shown. Outputs of the microcomputer 10 control actuation and direction of a motor 24 having an output shaft 26 which is coupled to the garage door 28 to open and close the door. A shaft revolution sensor 30 has its output connected to the microcomputer to provide a pair of pulses to the microcomputer to signal each motor revolution and the direction of rotation. The revolution sensor comprises a magnet secured to the shaft 26 and a pair of Hall effect devices near the path of the magnet. From the sensor information, the microcomputer determines the motor speed and deceleration and the door position. Typically each inch of door travel requires five motor revolutions and the position of the door is measured from the full open position. Thus a distance of 100 revolutions is equivalent to a door position of 20 inches below full open position.

The microcomputer is programmed to run in up and down learn modes to establish door open and closed limits and sensitivity settings, and in operate mode to open and close the door upon command and during each complete cycle to adjust the closed limit and the sensitivity settings when operating conditions reveal that changes in the apparent floor position or in the motor speed indicate that something has significantly changed in the door operation.

Figure 2:
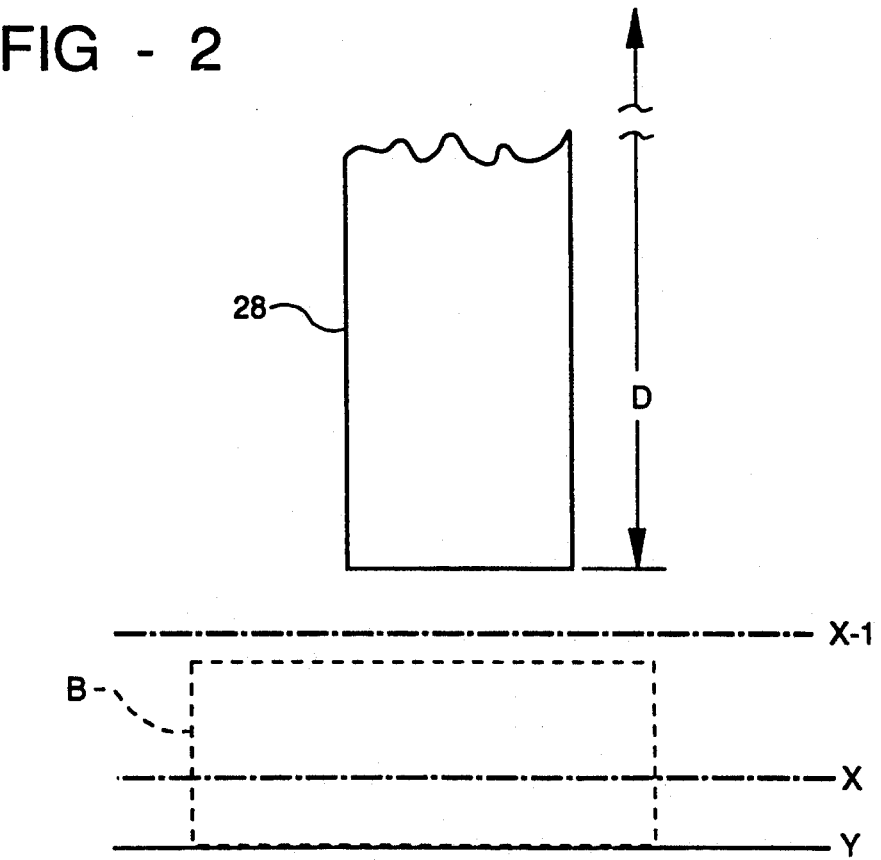
FIG. 2 is a diagram of door closed limits according to the invention.

FIG. 2 depicts the door position D (measured from open position) at a location near the floor. The initial fully closed or floor position, as learned by the program to be described below, is Y, which cannot be changed except during a learn mode. The current door closed limit is X, which at first is equal to Y. The value of X can be adjusted during operate mode each time the door closes. The level X-1 is the obstruction reference level, which is one inch above the closed limit. When the door position or distance D is less then X-1, as shown in FIG. 2, the controller is sensitive to slowing the motor such as would be caused by an obstruction. During closing the door will stop and reopen if such slowing is detected, and during opening the door will merely stop. When the distance is more than X-1 slowing of the motor is treated as a normal closing effect since the floor itself or a small amount of debris on the floor will slow or stop the motor during closing. To establish the X-1 position during the down learn mode, an obstruction reference abutment such as a 1 inch thick block of wood B is placed on the floor beneath the center of the door so that the door will stop at the obstruction reference or X-1 position.

The ensuing figures comprise a flow chart which reveals the general intent of the program to teach how the invention is carried out, although the actual program is more complex and is not suitable for an informational disclosure. In describing the functions of the algorithm, references to tasks which have been detailed in flow diagram function blocks are designated by <nn>, where nn is the block reference number.

Figure 3:
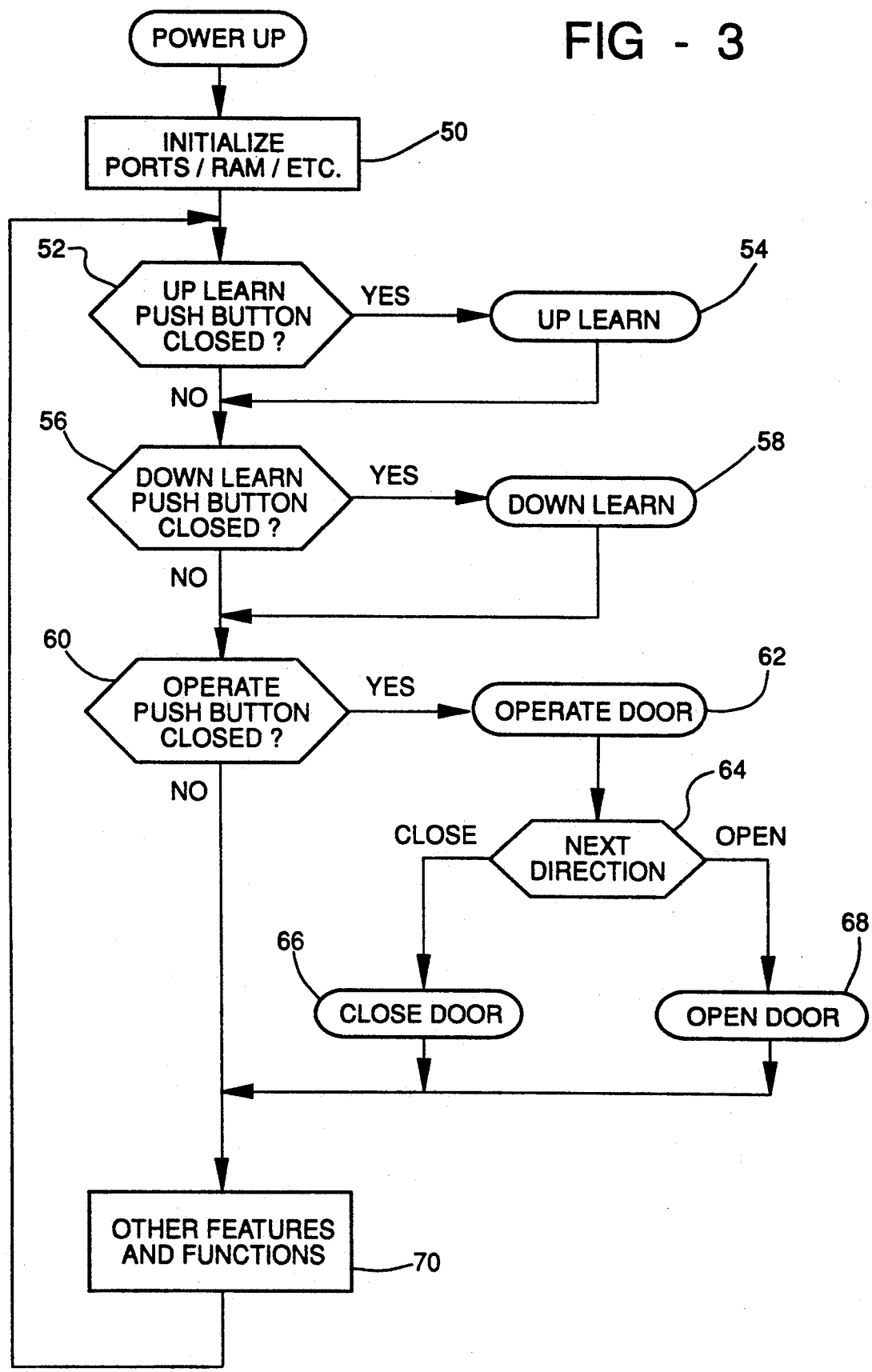
FIGS. 3 through 7 are flow charts representing the programming for the control circuit of FIG. 1, according to the invention.

An executive loop of the microcomputer program is shown in FIG. 3. Pursuant to power up, the device is initialized <50> by activating ports and loading RAM according to instructions in the non-volatile memory 12. Then the UP LEARN push button 14 is checked and if it is pressed <52>, the UP LEARN program is executed <54>; if not, the DOWN LEARN push button 16 is checked <56>. If it is pressed, the DOWN LEARN program is run <58>; if not the OPERATE push button 18 is checked <60>. If it is pressed the operate door routine is run <62>. That routine 62 comprises keeping a record of the last direction the door travelled and commanding that the next direction be opposite the last direction <64>. If the next direction is close, the close door routine is run <66>; if the next direction is open, the open door routine is run <68>. When the open or close door program is exited, or if the opperate push button is not pressed <60>, other features and functions of the operator are executed <70>. Then the program returns to UP LEARN block 52 to repeat the loop except for the initialization.

The UP LEARN program 54 is the first program to be run upon installation of a garage door operator. It will determine the open limit and the sensitivity of the obstruction detection for the open direction. Sensitivity is the motor speed below which obstruction contact is established. A high sensitivity is desired because it will cause faster response to the door touching an obstruction and it will impose the least stress on the door. Five different motor speeds are stored as selectable sensitivity levels. The UP LEARN routine allows the procedure to continue for two minutes. Each time the UP LEARN button 14 is pushed momentarily the door is moved up to two inches. If the button is held down, the door will move about 12 inches and stop. The button must be released and pressed again for further movement. When the desired fully open position is attained, the user releases the button and the controller stores the position as D=0. In any mode of operation, the motor speed is not measured for the first 0.5 second of motor operation to allow time to reach normal operating speed. Thus each algorithm includes a 0.5 second timer. While not shown in the flow charts, every motor revolution and its direction is detected to keep track of the door position.

Figure 4:
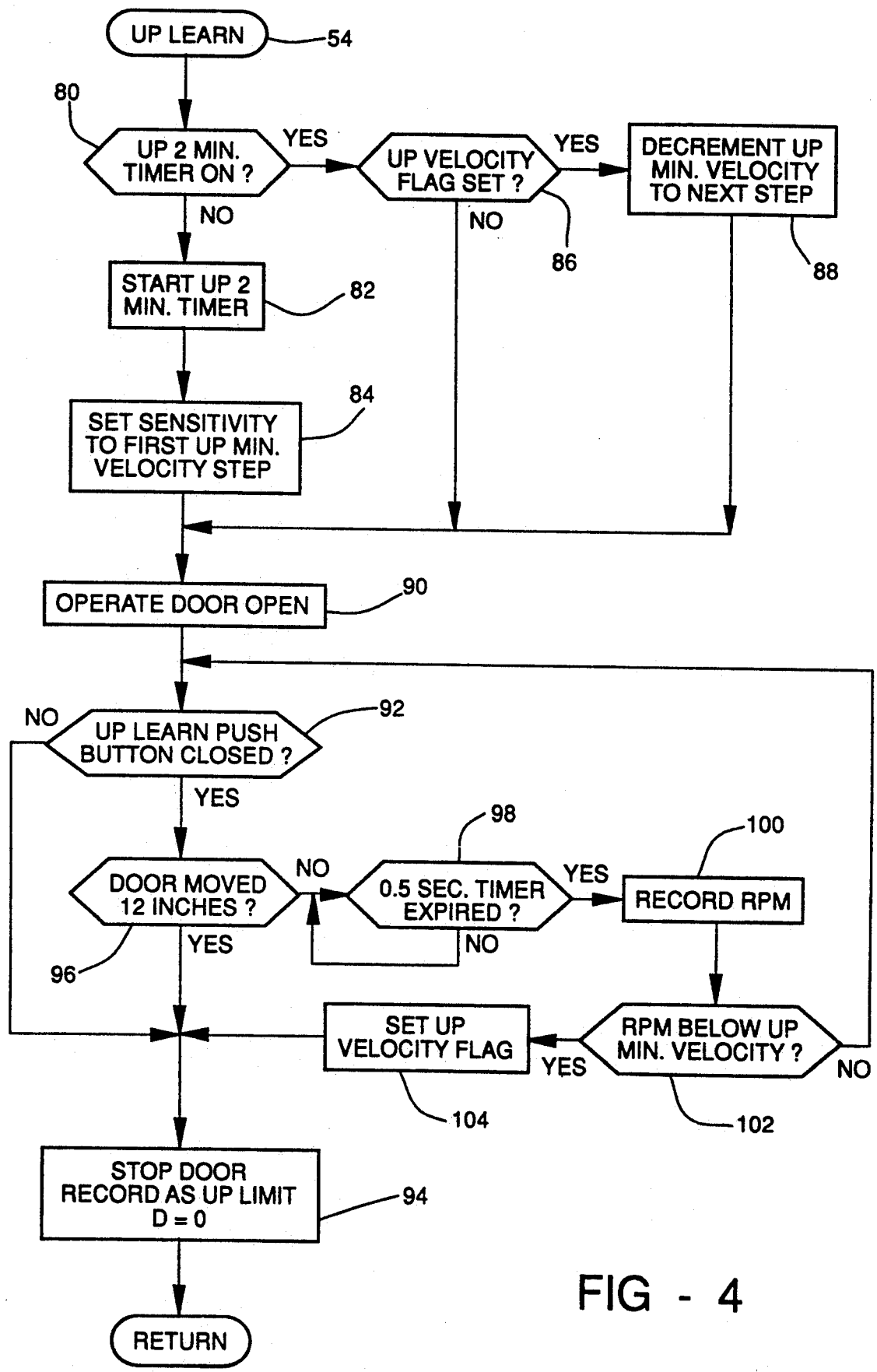

FIG. 4 illustrates the UP LEARN algorithm 54. If a two minute timer is not on <80>, it is started <82> and the highest sensitivity (up minimum velocity) is selected <84>. If the two minute timer is on <80>, and an UP VELOCITY flag is not set <86>, the blocks 82 and 84 are bypassed. If the UP VELOCITY flag is set <86>, the next lowest sensitivity is selected <88> and the blocks 82 and 84 are bypassed. Then the door is moved in the open direction <90> and the UP LEARN button is tested <92>. If the button closed, the door is stopped and the position D is recorded as the open limit, which is the zero reference for door position <94>. If, at block 92 the push button were closed and the door had moved 12 inches <96>, the block 94 would be reached and the door stopped. If the door had not moved 12 inches <96>, and a 0.5 second timer had not expired <98>, the program would wait for the 0.5 second. Then the motor speed would be recorded <100>(at each motor revolution), and if the speed is not below the selected sensitivity level <102>the program returns to block 92 to test the button state. If the door load is so large that the motor speed drops below the selected sensitivity <102>, the UP VELOCITY flag is set <104> and the door is stopped <94>. Each time the door is stopped the program returns to the executive loop. As it reenters the UP LEARN loop the program is repeated if the push button is again pressed.

If the two minute timer has not expired <80> and the UP VELOCITY flag is set, the sensitivity is reduced and the door is moved further to set a new value of the open limit. When the door finally reaches the desired fully open position the button is released and the timer is allowed to expire. The zero position is finally adopted as the open limit and the last sensitivity level used remains in storage as the sensitivity for the opening direction or the up minimum velocity.

After the UP LEARN procedure is completed, the one inch block of wood B is placed beneath the door and the DOW LEARN push button 16 is pressed. This initiates the down learn mode and starts the door moving toward the closed position. As in the UP LEARN mode, five different motor speed are stored as selectable sensitivity levels and the most sensitive is selected first. If there are no interruptions due to door loading the door will travel down until it hits the block without further manipulation of the button 16, and then will reopen. If the door stops before reaching the block, it will reopen and the button must be pressed again to continue the procedure with a lower sensitivity. Two minutes are allowed to complete the program.

Figure 5:
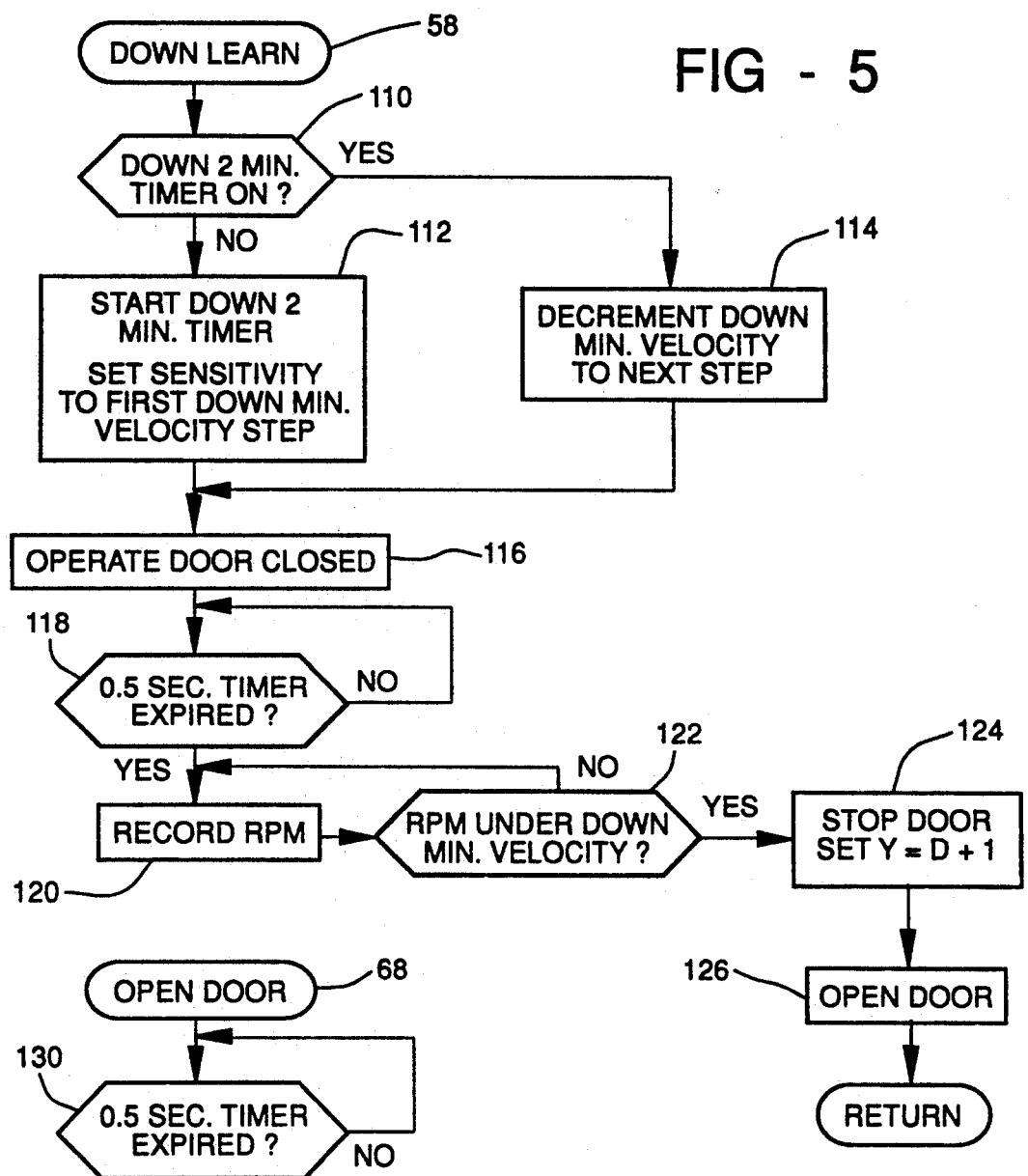

FIG. 5 depicts the DOWN LEARN algorithm 58. If the down two minute timer is not on <110> it is started and the highest sensitivity is selected from the stored values <112>. In subsequent passes through the loop, if the two minute timer is on <110> the sensitivity will be reduced to the next lower of the stored values <114>. In either case, the door is moved in the closing direction <116>. When the 0.5 second timer is expired <118>, the motor speed is recorded for each motor revolution <120>. The speed recording continues as long as the motor speed is not below the sensitivity setting or down minimum velocity <122>. When the motor speed does drop below that value, it is assumed that it has contacted the wooden block B, the door is stopped, and the initial learned closed position Y is calculated as the distance D traveled from the open limit plus one inch or Y=D+1 <124>. Finally the door is opened <126>. If the user observes that the door actually is closed, no further action is taken and the down learn mode is completed. The value of Y is stored in non-volatile memory and cannot be changed without again entering the down learn mode. The last selected value of sensitivity or down minimum velocity is also stored but is subject to adaptive adjustment during normal door operation.

Figure 6:
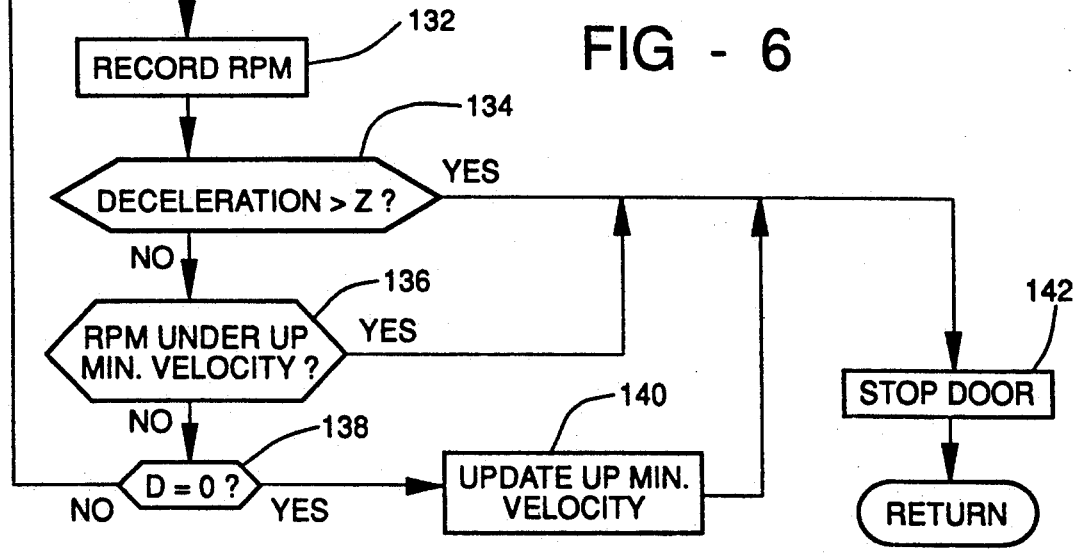

In the operate mode, the OPEN DOOR routine 68, shown in FIG. 6, comprises checking the 0.5 second timer <130> and, if it has expired, recording the motor speed <132>. The motor deceleration is calculated and compared to a preset value Z. If it is greater than Z <134>, the speed is not under the stored opening sensitivity <136> and the open limit D=0 has not been reached <138>, the speed recording continues. When the open limit is reached <138>, the sensitivity is updated <140> by substituting the minimum velocity (less an offset) detected in the current opening operation for the up minimum velocity. Then the door is stopped <142>. The door is also stopped if the motor deceleration exceeds Z <134> or the motor speed drops obstruction has slowed down the door. In this routine the updating of the sensitivity adaptively adjusts for changes in door opening force due to temperature change, wear, or other reasons.

The CLOSE DOOR program 66 handles the tasks of closing the door, detecting an obstruction by comparing speeds to the sensitivity value, updating the sensitivity, mapping the velocity at each revolution for the last several inches of closing travel, detecting an obstruction if the speed deviates a certain amount from the previous map, stopping and reopening the door if an obstruction is detected more than an inch above the closed limit position, and adaptively updating the closed limit position. The closed limit is designated a X (FIG. 2) and for the first operation after executing the up learn mode X is set equal to Y. Thereafter X is adjustable in 0.5 inch increments if the door closing is detected to be more than an inch above or below the previous X. However X is not permitted to wander more than 2 inches from the initial close position Y.

Figure 7:
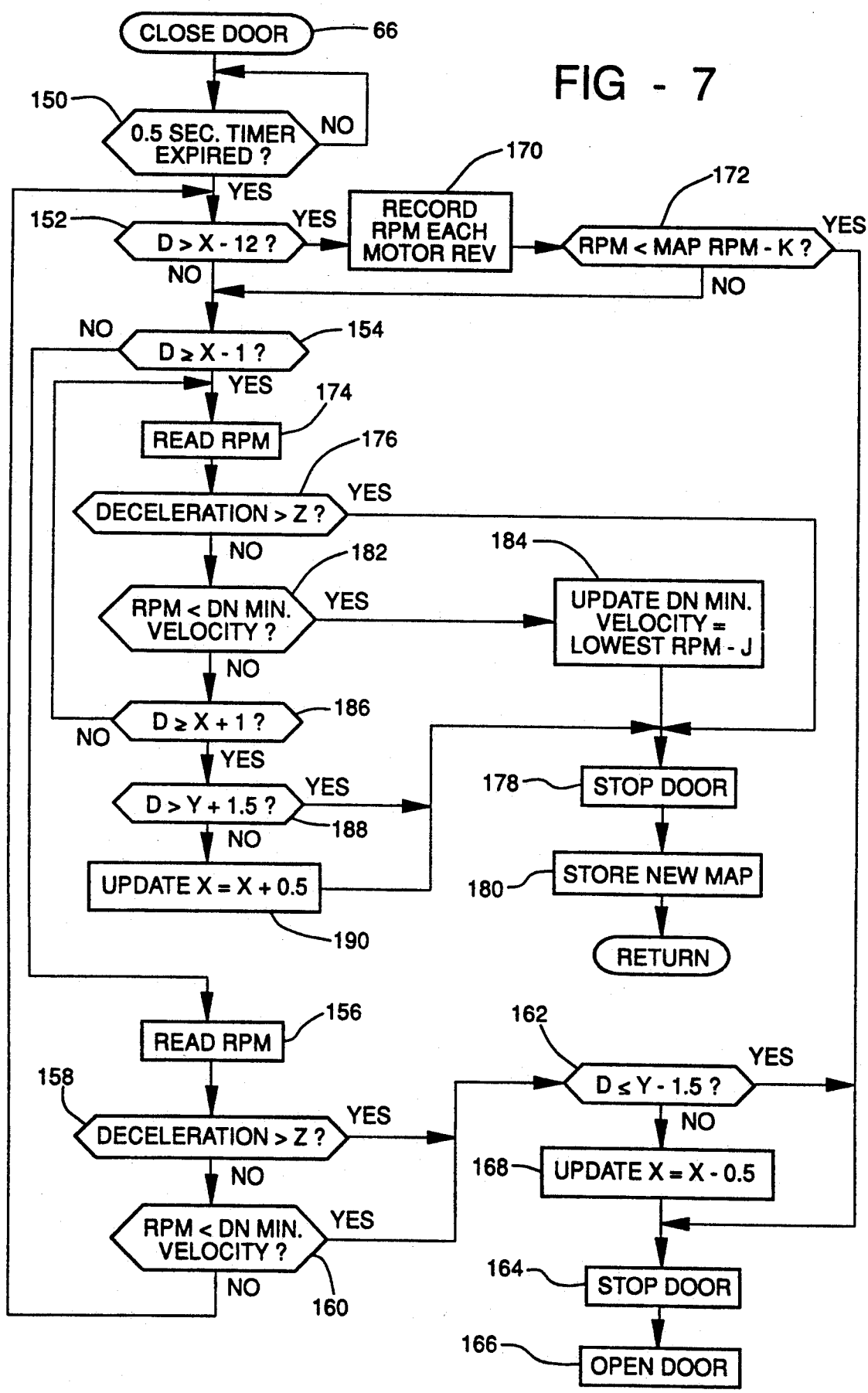

The CLOSE DOOR routine 66 is shown in FIG. 7. If the 0.5 second timer has expired <150> and the distance is not greater than X-12 <152>, the distance is compared to X-1 <154> to determine whether the door is in the obstruction detection range. If the distance is not greater than X-1 the motor speed is read <156>, the deceleration is greater than a preset reference Z<158> or the speed is less than the DOWN MINIMUM VELOCITY <160>, it is determined whether the distance is less than Y-1.5 <162>. If it is, the door is stopped <164> and then reopened <166>. If the distance is more than Y-1.5, the closed limit position X is decremented by 0.5 inch <168>. This logic adjusts the limit X when the door bottoms out more than an inch from X and yet assures that the new value of X is within two inches of Y. Where the motor speed is not less than the sensitivity value <160>, the program returns to block 152. There, if the distance D is greater than X-12, the door velocity is mapped by recording the speed for each motor revolution <170>. At each door position in the mapping range the speed is compared to the corresponding position in the previously stored map less a small offset K <172>, thereby affording a very sensitive obstruction detection. If the speed is less than the stored speed, the door is stopped <164> and reopened <166>; otherwise the program goes to the block 154. When the distance D is greater than the obstruction reference level X-1<154>, obstruction detection is no longer active but the same parameters and logic are used to detect bottoming of the door on the floor. The motor speed is read <174> and the deceleration is calculated. If the deceleration exceeds the value Z <176>, the door is stopped <178> and the new speed map is stored in place of the previous map <180>. If the deceleration test is passed <176>, the motor speed is compared to the sensitivity value. If it is less than that value <182>, the sensitivity value is adjusted by setting it equal to the lowest motor speed read during the door closing less a small offset J <184> and the door is stopped <178>. Where the motor speed is not less than the sensitivity value <182>, and the distance is not greater than X+1 <86>, the program returns to block 174. If, however, the distance is greater than X+1 <186> and the distance is greater than Y+1.5 <188>, the door is stopped <178>; when the distance is not greater than Y+1.5, the limit position X is updated to X+0.5 <190> and door is stopped. This logic assures that the limit X is incremented by 0.5 inch when the floor is detected to be more than an inch beyond X, but the update is permitted only when the new value of X is within two inches of the initial learned close position Y.

It will be seen then that when the door is opening, obstruction detection is active after the first 0.5 seconds of operation. The obstruction detection is a function of motor speed compared to the lowest motor speed recorded in the most recent successful opening operation less an offset value. For example, if an unloaded motor speed is 1750 RPM, the minimum velocity may be 1720 or 1700 RPM, depending on the previously recorded low motor speed. In addition, motor deceleration during opening is used for obstruction detection. Obstruction detection during closing is carried out from 0.5 seconds after start of closing until the obstruction reference position X-1 is reached. As in opening, it depends on the motor speed compared to the lowest motor speed of the previous closing operation and on deceleration. In addition, during closing the more sensitive mapping scheme is used in the range of X−12 to X−1 where point-by-point comparisons of current and past velocities are used to sense contact with an obstruction. Also, the adaptive adjustment of the closed limit position X allow automatic updating of the effective floor position which may change due to heaving or an accumulation of ice, for example.

The embodiments of the invention in which an exclusive property or privilege is claimed are defined as follows:

1. An electronic control for a garage door opener having adjustable open and closed position limits and adjustable opening and closing obstruction force sensitivity limits, the control having a learn mode for setting the limits and an operate mode for door opening and closing; the control comprising:

manually controlled learn switch means for entering a learn mode;

manually controlled operate switch means for entering an operate mode to control door movement;

means responsive to the learn switch means for establishing limits of the position and sensitivity;

means responsive to the operate switch means for operating the control within the established limits; and the means for operating the control including limit enhancing means for establishing new limits while in the operate mode.

2. The control ad defined in claim 1 wherein:

the means for establishing limits establishes an initial door closed position limit by sensing door closing speed and detecting a speed change when the door reaches the floor or a reference abutment above the floor to establish an initial obstruction reference level at a fixed distance above the floor which reference level obstruction sensing occurs; and the limit enhancing means includes means for detecting the floor position upon each door closing when in the operate mode, and means for updating the door closed position limit according to the latest detected floor position.

3. The control as defined in claim 2 wherein the means for detecting the floor position comprises means for sensing door closing speed and detecting the speed change when the door contacts the floor.

4. The control as defined in claim 2 wherein the means for updating includes means for restricting updating of the door closed position limit to maintain the closed position limit in a preset range from the initial closed position limit.

5. The control as defined in claim 1 wherein the door opener has a motor and a motor speed sensor, and wherein:

the means responsive to the learn switch means for establishing limits includes means for setting opening and closing motor speed limits; and the limit enhancing means comprises means for adjusting the respective motor speed limits as a function of motor speed for respective opening and closing movements during the operate mode.

6. The control as defined in claim 1 wherein the door opener has a motor and a motor speed sensor, and wherein:

the means responsive to the learn switch means for establishing limits includes means for setting opening and closing motor speed limits;

the limit enhancing means comprises means for recording the lowest motor speed during respective opening and closing movements during the operate mode; and means for adjusting the respective motor speed limit upon completion of each opening movement and each closing movement, the adjustment comprising setting the speed limit equal to the respective recorded lowest motor speed less an offset value.

7. The control as defined in claim 5 wherein the control senses a door obstruction by comparing the motor speed to a programmed minimum velocity for each direction of door movement, and the means for establishing limits comprises:

means effective in the learn mode for initially setting a minimum motor velocity for maximum sensitivity;

means responsive to the learn switch means for operating the control to attempt door movement in one direction, for stopping door movement in response to motor speed falling to the set minimum motor velocity, and for decreasing the minimum velocity if the door movement is not completed.

8. The control as defined in claim 5 wherein the control senses a door obstruction by comparing the motor speed to a programmed minimum velocity for each direction of door movement, the control includes a plurality of stored preset motor speed limit values, and the means for establishing limits comprises:

means effective in the learn mode for initially setting a minimum motor velocity equal to the highest of the preset limit values for maximum sensitivity;

means responsive to the learn switch means for operating the control to effect door movement in one direction, for stopping door movement in response to motor speed falling to the set minimum motor velocity, for decrementing the set minimum velocity to the next lower of the stored values if the door movement is not completed, and for repeating attempts to complete door movement in the one direction.

9. The control as defined in claim 5 wherein the means for establishing limits includes means for mapping door closing speeds during the operate mode by sensing motor speeds and storing the sensed speeds upon completion of closing;

the control further including means for detecting an obstruction by comparing sensed speeds with corresponding previously stored speeds.

10. The control as defined in claim 1 wherein the means for establishing limits includes means for mapping door closing speeds during the operate mode by sensing motor speeds at each motor revolution and storing the sensed speeds upon completion of closing for a range proximate the closed door position;

the control further including means for comparing sensed speeds with corresponding previously stored speeds and for stopping door closing when the sensed speed is lower by an offset amount than the corresponding stored speed for the same door position.

11. In a garage door operator having a microcomputer based control, a motor for opening and closing a door, a motor revolution sensor for determining motor speed and door position, adjustable open and closed position limits and adjustable opening and closing obstruction force sensitivity limits stored in a memory, the control having a learn mode for setting the limits and an operate mode for normal door opening and closing; the method comprising the steps of:

in learn mode, operating the door and setting an open limit and an initial closed position limit;

in learn mode during the step of operating the door, setting sensitivity limits for determining response to a door obstruction;

initiating the operate mode; and then adaptively adjusting at least one of the limits while running the door operator in the operate mode.

12. The method as defined in claim 11 wherein the step of operating the door and setting open and closed position limits comprises the steps of:

initiating an up learn mode, operating the door to move in the opening direction to a desired full open position, and storing the full open position limit; and initiating a down learn mode, operating the door to move in the closing direction to a stop at a closed reference position, and establishing an initial closed limit by detecting motor speed decrease at the stop.

13. The method as defined in claim 11 wherein the step of setting sensitivity limits comprises:

setting sensitivity limits by selecting a motor speed limit for each direction, comparing motor speed to the limit while operating in each learn mode, stopping the door if the speed limit is reached before the respective position limit is attained, and decreasing the speed limit to a level sufficient for the door to travel to the respective position limit, whereby the sufficient level becomes the learned speed limit.

14. The method as defined in claim 11 wherein a plurality of different motor speed limits are stored, and the step of setting sensitivity limits for each direction of door movement comprises:
   initially selecting the highest motor speed limit;
   operating the door in the learn mode in a given direction and continually measuring the motor speed, whereby the motor speed is a function of load;
   comparing the measured motor speed with the selected motor speed limit;
   stopping the door when the measured speed reaches the limit:
   then decrementing the motor speed limit to the next lower stored limit;
   repeating the operating and comparing steps to attempt completion of the door movement in the given direction and decrementing the limit when stopping occurs; and
   finally adopting as the sensitivity limit the motor speed limit which results in no stopping of the door prior to reaching its limit position.

15. The method as defined in claim 11 wherein the step of adaptively adjusting at least one of the limits while in the operate mode comprises adjusting the sensitivity limits by the steps of:
   recording the lowest motor speeds during respective opening and closing movements; and
   adjusting the respective sensitivity limit upon completion of each opening movement and each closing movement by setting the speed limit equal to the respective recorded lowest motor speed less an offset value.

16. The method as defined in claim 11 wherein the step of adaptively adjusting at least one of the limits includes the steps of:
   closing the door while in the operate mode;
   detecting the floor position; and
   updating the door closed position limit according to the latest detected floor position.

17. The method as defined in claim 16 wherein the adaptive adjustment of the door closed position limit is restricted to a preset range from the initial closed position limit.

18. The method as defined in claim 16 including the step of:
   updating the door closed position limit only when the detected floor position is a predetermined distance from the current closed position limit.

19. The method as defined in claim 11 including the steps of:
   mapping the door closing speeds during the operate mode by sensing motor speeds and storing the sensed speeds upon completion of closing; and
   detecting an obstruction by comparing the sensed speeds with corresponding previously stored speeds.

20. The method as defined in claim 11 including the steps of:
   mapping door closing speeds during the operate mode by sensing motor speeds at each motor revolution and storing the sensed speeds upon completion of closing for a range proximate closed door position; and
   comparing the sensed speeds with corresponding previously stored speeds and stopping door closing when the sensed speed is lower by an offset amount than the corresponding stored speed for the same door position.

21. The method as defined in claim 11 including the steps of:
   establishing an obstruction reference level above the floor, above which level obstruction detection occurs;
   operating the door in the region above the obstruction reference level, comparing the motor speed with the sensitivity limit, and stopping the door when the motor speed becomes less than the sensitivity limit.

22. The method as defined in claim 11 including the steps of:
   establishing an obstruction reference level above the floor, above which level obstruction detection occurs;
   operating the door in the region above the obstruction reference level, determining motor deceleration from motor revolution measurements, and stopping the door when the motor deceleration exceeds a set limit.

* * * * *